United States Patent [19]

Eggett

[11] Patent Number: 4,480,352

[45] Date of Patent: Nov. 6, 1984

[54] APPARATUS FOR CLEANING LENSES, MIRRORS AND THE LIKE

[75] Inventor: John G. Eggett, Surrey, Canada

[73] Assignee: Trend Setter Products, Inc., Surrey, Canada

[21] Appl. No.: 472,938

[22] Filed: Mar. 7, 1983

[51] Int. Cl.³ .............................................. G02C 13/00
[52] U.S. Cl. .................................... 15/214; 15/210 A
[58] Field of Search ................. 15/210 A, 214, 210 R, 15/209 E, 210 B, 218, 218.1, 244 R, 244 B, 104.94; 401/10

[56] References Cited

U.S. PATENT DOCUMENTS

| | | | |
|---|---|---|---|
| 2,658,221 | 11/1953 | Nicoli | 15/210 A |
| 2,908,923 | 10/1959 | Schlechter | 401/10 |
| 3,472,517 | 10/1969 | Shimono | 15/210 R |
| 4,126,962 | 11/1978 | Polcaro | 15/210 R |

*Primary Examiner*—Edward L. Roberts
*Attorney, Agent, or Firm*—Benjamin P. Reese, II

[57] ABSTRACT

An apparatus for cleaning lenses, mirrors and the like. A single, elongated piece of essentially flat plastic material has a pair of parallel, transverse grooves which demarcate a pair of jaws with a connecting element there between. By folding along such grooves, the jaws can be positioned to function as a pincer. A cleaning pad is affixed to the free end of each of the jaws for simultaneous cleaning of two parallel surfaces of a lens or a mirror or the like when the jaws are positioned to function as a pincer. Each of the cleaning pads comprises a soft, supple cleaning cloth having a velvety surface finish and a soft, cushiony base of foam or sponge rubber or other similar absorbent material. The velvety surfaces of the cleaning cloths permit effective, non-scratching cleaning of lenses, mirrors and the like, including plastic eyeglass lenses, without the use of water, chemical cleaning solutions or similar liquids. Moisture and residues of dirt and oil which are removed from the cleaned surfaces pass through the open pore network of the cleaning cloths for subsequent absorption by the open pore network of the bases.

7 Claims, 3 Drawing Figures

APPARATUS FOR CLEANING LENSES, MIRRORS AND THE LIKE

BACKGROUND OF THE INVENTION

This invention relates to an apparatus for cleaning lenses, mirrors and the like which does not require the use of water, chemical cleaning solutions or other similar liquids.

Various cloths and tissues for cleaning lenses, mirrors and the like are provided by the prior art. The majority of the prior art cloths and tissues require the use of water, chemical cleaning solutions or other similar liquids for effective removal of the residues of dirt and oil which are often present on the surfaces of lenses, mirrors and the like. Certain of the prior art cloths and tissues are pretreated with chemical cleaning solutions to eliminate the requirement for use of water, chemical cleaning solutions or other similar liquids for removal of such residues from the surfaces of lenses, mirrors and the like. Unfortunately, such prior art cloths and tissues have not proved to be as effective for their intended purpose as untreated cloths and tissues used in combination with water, chemical cleaning solutions or other similar liquids.

The prior art provides cleaning kits comprising cloth or tissues and chemical cleaning solutions or other similar liquids. Such cleaning kits have proved to be convenient for use in scientific laboratories, industrial plants, photographic studios and other similar facilities for cleaning photographic lenses, microscope lenses and mirrors and other similar lenses and mirrors as well as in the offices of ophthalmologists, optometrists and opticians for cleaning eyeglass lenses. Unfortunately, such cleaning kits have proved to be cumbersome and inconvenient for most eyeglass lens cleaning applications outside the offices of opthalmologists, optometrists and opticians. Thus, prior art cloths and tissues intended for cleaning lenses, mirrors and the like and handkerchiefs, shirts, ties and other clothing items improvised for that purpose continue to be the most popular means for routine cleaning of eyeglass lenses by persons outside the offices of opthamologists, optometrists and opticans.

It is well known that plastic eyeglass lenses are often scratched during routine cleaning with clothing items and prior art cloths and tissues without the use of water, chemical cleaning solutions or other similar liquids. And, of course, clothing items are often soiled or wrinkled during such cleaning processes. Yet, the prior art has not provided an apparatus or other means which effectively cleans lenses, mirrors and the like without such disadvantages. It is highly desirable to have such an apparatus or other means in a compact form which is convenient for use for routine eyeglass lens cleaning by persons outside the offices of opthamologists, optometrists and opticians.

SUMMARY OF THE INVENTION

The present invention provides an apparatus for cleaning lenses, mirrors and the like which does not require the use of water, chemical cleaning solutions or other similar liquids for effective cleaning. The apparatus of the present invention is in a compact form which is convenient for routine cleaning of eyeglass lenses by persons outside the offices of ophthalmologists, optometrists and opticians.

The apparatus of the present invention comprises a pair of soft, disk-shaped cleaning pads and a pair of essentially flat, pivotedly connected jaws. Each of the cleaning pads is affixed to one surface of one of the jaws near its free or outer end. In the preferred embodiment, a single, elongated piece of flat plastic material has a pair of parallel, transverse grooves which demarcate the jaws and a connecting element. The jaws can be positioned for use as a compact pincer to clean two parallel surfaces of a lens or a mirror or the like by folding this piece of plastic material along its grooves.

Each of the cleaning pads is comprised of a soft, supple cleaning cloth having a velvety surface finish and a soft, cushiony base of foam or sponge rubber or other similar absorbent material. The cleaning cloth and base of each cleaning pad are joined by a thin layer of pliable glue. The velvety surface finish of the cleaning cloth of each cleaning pad permits effective cleaning of lenses, mirrors and the like, including plastic eyeglass lenses, without scratching the surfaces thereof. The high absorbency of the base of each cleaning pad permits repeated cleaning of lenses, mirrors and the like. Moisture and residues of dirt and oil on the surfaces of lenses, mirrors and the like are absorbed and absorbed by the cleaning cloth of each cleaning pad, migrate through the open pore network of the cleaning cloth and adjacent layer of glue, and, then, are absorbed by the open pore network of the base.

These and many other advantages, features and objects of the present invention will be apparent from the following Brief Description of the Drawings, Detailed Description of the Preferred Embodiment and Claims, and the accompanying Drawings.

DETAILED DESCRIPTION OF THE PREFERRED EMBODIMENT

Figure 1:
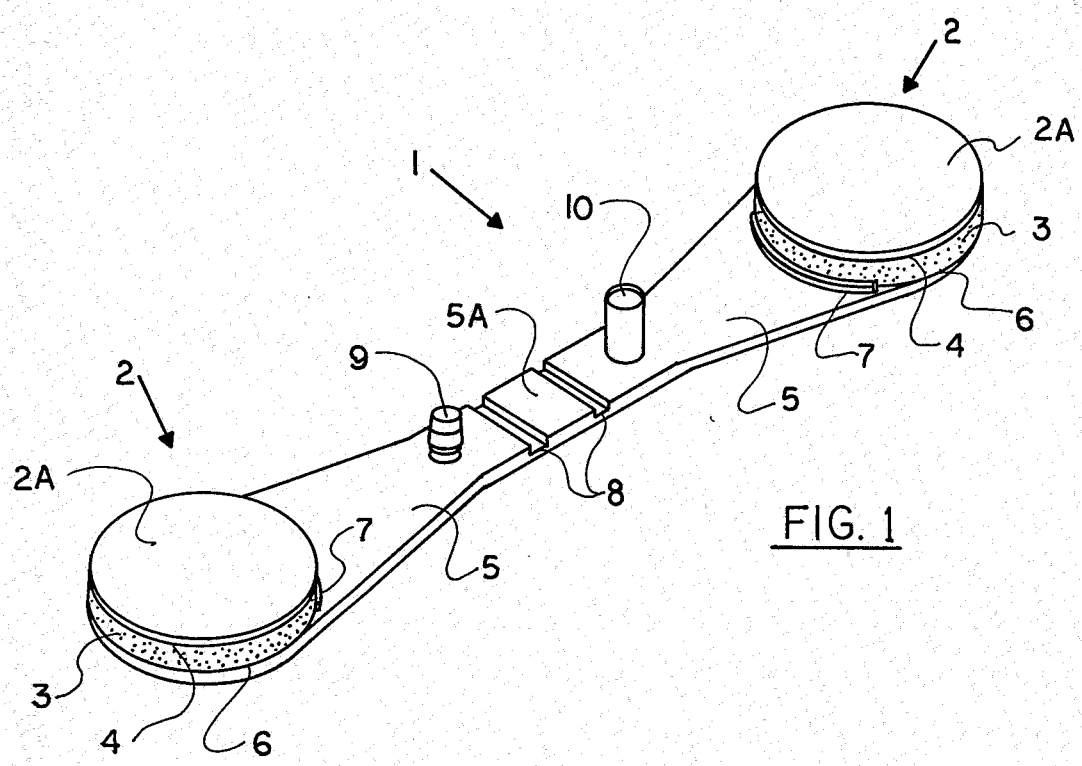
FIG. 1 is a perspective view of the preferred embodiment of the apparatus of the present invention with its two jaws in a flat, open position.
Figure 3:
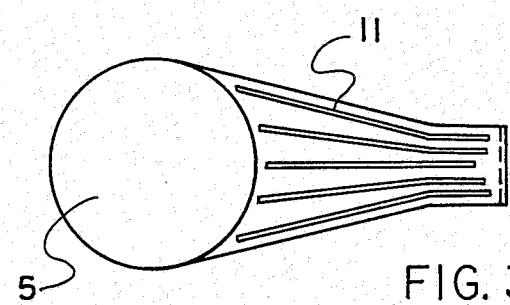
FIG. 3 is a top plan view or a bottom plan view of the apparatus illustrated in FIG. 1 with its two jaws in a closed, opposed position.
Figure 2:
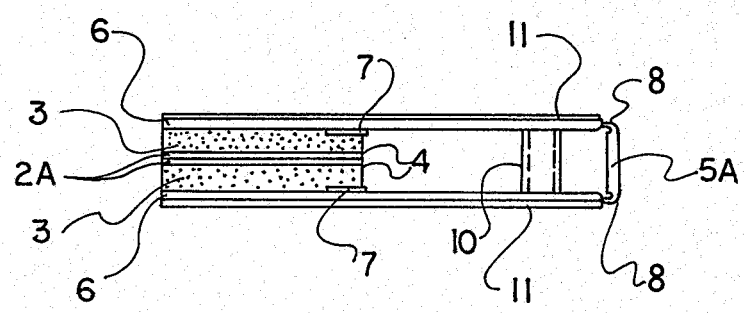
FIG. 2 is a side elevational view of the apparatus illustrated in FIG. 1 with its two jaws in a closed, opposed position.

The preferred embodiment of the apparatus of the present invention is illustrated in FIGS. 1-3.

Referring to FIG. 1, an apparatus 1 for cleaning lenses, mirrors and the like is illustrated in a flat, open position. The apparatus 1 comprises a pair of soft, disk-shaped cleaning pads 2, each of which is fabricated by joining a disk-shaped cleaning cloth 2A and a disk-shaped base 3 with a thin layer of non-water soluble pliable glue 4, and a pair of essentially flat, pivotedly connected jaws 5. The cleaning cloths 2A are fabricated from a soft, supple fabric having a velvety surface finish of the type normally associated with suede, such as the fabric identified by the Savina Ultrasuede trademark. The bases 3 are fabricated from a soft, cushiony, absorbent material, such as foam or sponge rubber. Each of the bases 3 is affixed to one surface of one of the jaws 5 near the free or outer end thereof with a layer of non-water soluble pliable glue 6. Each of the jaws 5 has an arc-shaped rib 7 near the free or outer end thereof which functions as a positioning means during the process of glueing a base 3 to the jaw 5.

The pivotedly connected jaws 5 are preferably fabricated as a single, elongated, flat piece of injection molded ABS or other suitable high impact resistant plastic material having a pair of parallel, transverse grooves 8 which demarcate two separate jaws 5 with a connecting element 5A there between. As best illustrated in FIG. 1, in addition to the connecting element 5A, each of the jaws 5 is provided with a connecting means for interlocking cooperation with the connecting means of the other, such as a shaft 9 on the left jaw 5 and a socket 10 on the right jaw 5 which function in combination as a snap or pressure fit fastener. By folding along the grooves 8 and forcing the shaft 9 into the socket 10, the jaws 5 can be placed in a closed, opposed position, as best illustrated in FIG. 2, which permits the apparatus 1 to function as a pincer.

Referring to FIGS. 2 and 3, it will be seen that each of the jaws 5 is provided with a plurality of longitudinal ribs 11 on the surface oppose its surface upon which one of the cleaning pads 2 is affixed. The ribs 11 facilitate hand gripping of the jaws 5 by the user of the apparatus 1 while cleaning a lens or mirror or the like. It will be readily appreciated that other means for texturing the appropriate surfaces of the jaws 5 can be substituted for the ribs 11. It will also be seen in FIG. 2 that the jaws 5, connecting element 5A and socket 10 circumscribe an opening for a key chain, key ring or the like when the jaws 5 are in their closed, opposed position.

Having described the structure of the apparatus 1, its principal methods of use for cleaning lenses, mirrors and the like will now be described. First, with its jaws 5 in a flat, open position as illustrated in FIG. 1, the apparatus 1 can be used to clean one surface of an eyeglass lens or other lens or mirror or the like by gripping one of the jaws 5 with one hand and buffing that surface with one of the cleaning pads 2. Next, with its jaws 5 in a closed, opposed position as best illustrated in FIG. 2, the apparatus 1 can be used as a pincer to clean both parallel surfaces of an eyeglass lens or other essentially disk-shaped lens or mirror or the like by opening the jaws 5 slightly, positioning the cleaning pads 2 on the parallel surfaces, squeezing the jaws 5 with one hand, and buffing the parallel surfaces. With either method of use of the apparatus 1 described above, a circular motion is preferred during the buffing process. Also the base(s) 3 compress to adjust the cleaning pad(s) 2 to the contour of the surface(s) of the particular lens or mirror or the like during the buffing process with either of the described methods of use of the apparatus 1.

No water, chemical cleaning solution or other similar liquid is necessary for cleaning lenses, mirrors and the like when using either of the above described methods of use of the apparatus 1. As the surface(s) of the lens or mirror or the like is buffed, the cleaning cloth(s) 2A of the cleaning pad(s) 2 adsorb and absorb moisture and residues of dirt and oil from such surface(s). The greatest portion of the moisture and residues of dirt and oil removed from such surface(s) is further absorbed through the open pore network of the cleaning cloth(s) 2A and glue 4 into the open pore network of the absorbent base(s) 3. Since each of its cleaning pads 2 is comprised of a cleaning cloth 2A having a velvety surface finish and an absorbent base 3 having a high volume of open porosity, the apparatus 1 is capable of extended use for cleaning lenses, mirrors and the like without scratching plastic eyeglass lenses or other lenses, mirrors and the like fabricated from relatively soft materials. When the accumulation of dirt and oil in the open pore network of the bases 3 of the cleaning pads 2 substantially impairs their absorbency, the apparatus 1 can be disposed of and a new apparatus 1 acquired.

While the present invention has been described and illustrated in connection with its preferred embodiment, it should be understood that there may be other embodiments which fall within the scope and spirit of the present invention as defined by the following claims.

I claim:

1. An apparatus for cleaning lenses, mirrors and the like, comprising:

a single piece of plastic material having a pair of parallel, transverse grooves which demarcate a pair of jaws and a connecting element there between, said single piece of plastic material being essentially flat and foldable along said grooves such that said jaws are placeable in a closed, opposed position to form a pincer; and a pair of cleaning pads, each of said cleaning pads being affixed to one of said jaws near the free end thereof for simultaneous cleaning of two parallel surfaces of a lens or a mirror or the like when said jaws are placed in a closed, opposed position to form a pincer.

2. An apparatus for cleaning lenses, mirrors and the like as recited in claim 1, wherein each of said cleaning pads comprises a cleaning cloth fabricated from a soft, supple fabric having a velvety surface finish and an open pore network and an absorbent base fabricated from a soft, cushiony material having an open pore network.

3. An apparatus for cleaning lenses, mirrors and the like as recited in claim 2, wherein each of said cleaning pads further comprises a thin layer of non-water soluble, pliable glue between said cleaning cloth and said absorbent base, said thin layer of non-water soluble, pliable glue having an open pore network.

4. An apparatus for cleaning lenses, mirrors and the like as recited in claim 3, wherein each of said cleaning pads is affixed to one of said jaws near the free end thereof with a layer of non-water soluble, pliable glue between said absorbent base and the respective one of said jaws.

5. An apparatus for cleaning lenses, mirrors and the like, comprising:

a single piece of plastic material having a pair of parallel, transverse grooves which demarcate a pair of jaws and a connecting element there between, said single piece of plastic material being essentially flat and foldable along said grooves such that said jaws are placeable in a closed, opposed position to form a pincer;

a pair of cleaning pads, each of said cleaning pads being affixed to one of said jaws near the free end thereof for simultaneous cleaning of two parallel surfaces of a lens or a mirror or the like when said jaws are placed in a closed, opposed position to form a pincer; and a connecting means on each of said jaws for interlocking cooperation when said single piece of plastic material is folded along said grooves.

6. An apparatus for cleaning lenses, mirrors and the like as recited in claim 5, wherein one of said connecting means is a shaft and the other of said connecting means is a socket.

7. An apparatus for cleaning lenses, mirrors and the like as recited in claim 6, further comprising a plurality of longitudinal ribs on one surface of each of said jaws.

* * * * *

UNITED STATES PATENT AND TRADEMARK OFFICE
CERTIFICATE OF CORRECTION

PATENT NO. : 4,480,352

DATED : November 06, 1984

INVENTOR(S) : John G. Eggett

It is certified that error appears in the above-identified patent and that said Letters Patent is hereby corrected as shown below:

In Column 2, Line 24, the first word "absorbed" should read --adsorbed--.

Signed and Sealed this

Nineteenth Day of March 1985

[SEAL]

Attest:

DONALD J. QUIGG

Attesting Officer

Acting Commissioner of Patents and Trademarks